(12) United States Patent
Lekselius

(10) Patent No.: US 7,937,045 B2
(45) Date of Patent: May 3, 2011

(54) SOFTMULTIBAND RADIO FOR ULTRA WIDE BAND

(75) Inventor: Anders Niklas Lekselius, Upplands Vasby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 860 days.

(21) Appl. No.: 11/870,556

(22) Filed: Oct. 11, 2007

(65) Prior Publication Data

US 2009/0096660 A1    Apr. 16, 2009

(51) Int. Cl.
*H04B 1/40* (2006.01)
(52) U.S. Cl. ......... 455/75; 455/428; 455/63.3; 455/515; 370/208; 710/240
(58) Field of Classification Search ............. 455/75, 455/428, 63.3, 515, 434, 522, 68, 71, 113, 455/136, 161.1, 177.1, 182.1, 192.1; 370/208, 370/329, 254; 710/240
See application file for complete search history.

(56) References Cited

U.S. PATENT DOCUMENTS

| | | | | |
|---|---|---|---|---|
| 6,885,665 B2* | 4/2005 | Kaplan | ........................ | 370/390 |
| 7,263,333 B2* | 8/2007 | Roberts | ..................... | 455/67.13 |
| 7,589,597 B2* | 9/2009 | Chang et al. | .................... | 331/37 |
| 7,624,214 B2* | 11/2009 | Lee et al. | ....................... | 710/240 |
| 7,705,797 B2* | 4/2010 | Philippakis | ................... | 343/833 |
| 2005/0163042 A1* | 7/2005 | Roberts | ........................ | 370/208 |
| 2005/0237923 A1* | 10/2005 | Balakrishnan et al. | ....... | 370/208 |
| 2006/0128351 A1 | 6/2006 | Hassan et al. | | |
| 2007/0105518 A1* | 5/2007 | Chang et al. | .................. | 455/260 |
| 2007/0211620 A1* | 9/2007 | McBeath et al. | .............. | 370/209 |
| 2008/0062919 A1* | 3/2008 | Chen et al. | ................... | 370/329 |
| 2008/0082709 A1* | 4/2008 | Lee et al. | ...................... | 710/240 |
| 2008/0232270 A1* | 9/2008 | Fleming et al. | ............... | 370/254 |
| 2008/0232311 A1* | 9/2008 | Reumerman et al. | ......... | 370/329 |
| 2008/0297415 A1* | 12/2008 | Berens et al. | ................. | 342/372 |
| 2010/0177718 A1* | 7/2010 | Harle et al. | .................... | 370/329 |
| 2010/0226412 A1* | 9/2010 | Weir | .............................. | 375/130 |

FOREIGN PATENT DOCUMENTS

WO    WO 2006/120648 A2    11/2006

OTHER PUBLICATIONS

International Search Report and Written Opinion issued in corresponding international application No. PCT/IB2008/051364 mailed Oct. 7, 2008, 16 pages.

* cited by examiner

*Primary Examiner* — Minh D Dao
(74) *Attorney, Agent, or Firm* — Harrity & Harrity, LLP

(57) ABSTRACT

An ultra wide band device may announce a first idle message on a first ultra wide band sub-band associated with a first beacon group, announce a second idle message on a second ultra wide band sub-band associated with a second beacon group, and switch between the first and the second ultra wide band sub-bands to maintain a first connection with the first beacon group and a second connection with the second beacon group.

25 Claims, 11 Drawing Sheets

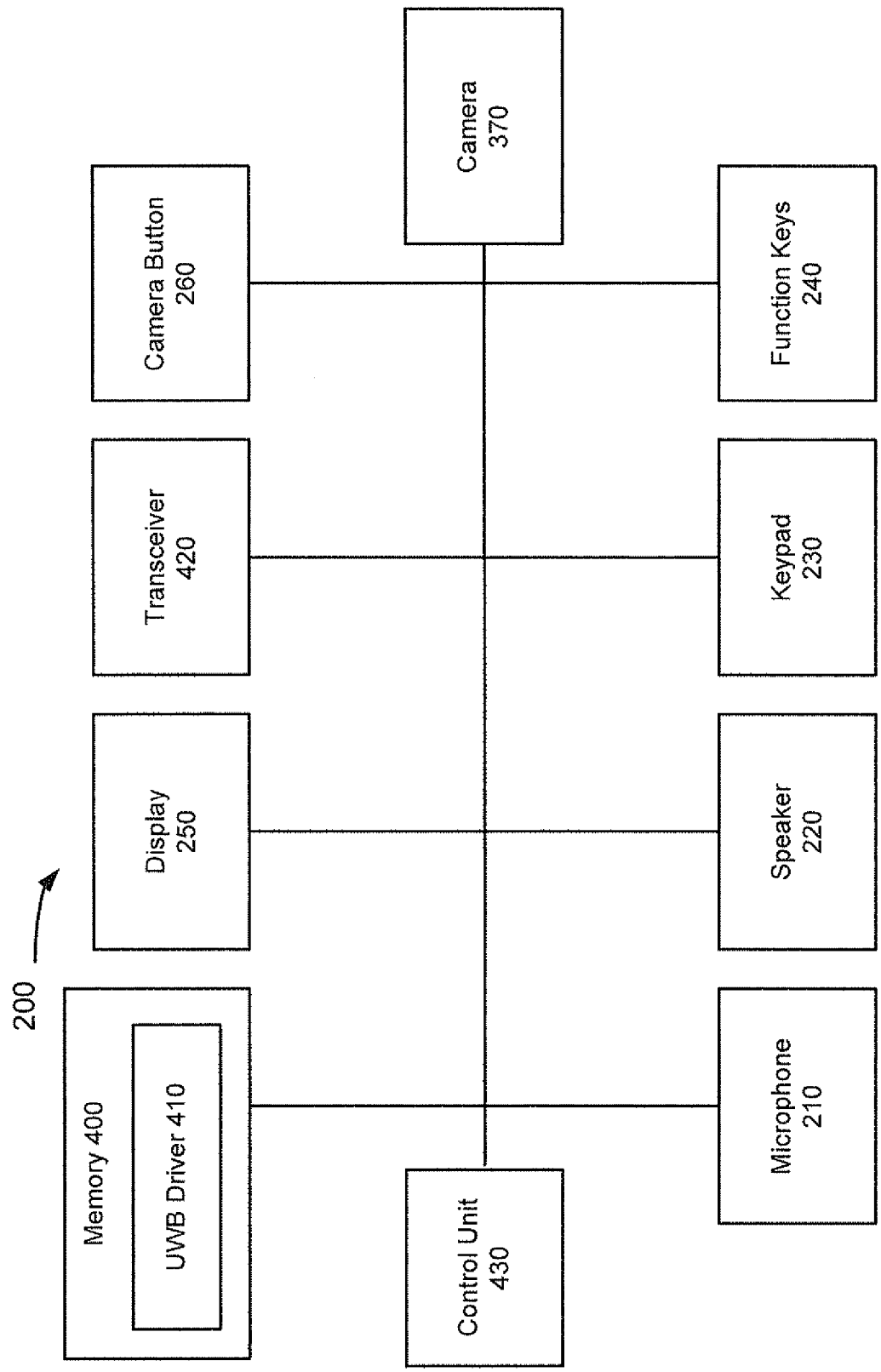

SOFTMULTIBAND RADIO FOR ULTRA WIDE BAND

BACKGROUND

Ultra Wide Band (UWB) is an emerging wireless technology that may support high data rates over short distances. Unlike traditional narrowband radio, a UWB radio transmission may be characterized by its broad spectrum usage. For example, under the Multiband Orthogonal Frequency Division Multiplexing (MB-OFDM) framework, UWB may be divided into five bandgroups (BGs). The five BGs may include fourteen sub-bands, where each sub-band may have a bandwidth of 528 megahertz (MHz). A radio device that supports a certain BG may support all the sub-bands in that BG, but, for connection purposes, may support one sub-band at a time due to hardware limitations. In this regard, a radio device may be subjected to connectivity limitations between/among other radio devices.

SUMMARY

According to one aspect, a method may be performed on an ultra wide band device. The method may include announcing a first idle message on a first ultra wide band sub-band associated with a first beacon group, announcing a second idle message on a second ultra wide band sub-band associated with a second beacon group, and switching between the first and the second ultra wide band sub-bands to maintain a first connection with the first beacon group and a second connection with the second beacon group.

Additionally, the method may include reserving a data slot on the first ultra wide band sub-band.

Additionally, the method may include transmitting data based on the reserved data slot.

Additionally, the announcing of the first idle message may include specifying an idle period that corresponds to the first idle message.

Additionally, the first and the second ultra wide band sub-bands may relate to different bandgroups.

Additionally, the first connection and the second connection may be based on different protocols.

Additionally, the method may include receiving a request to forward data from the first beacon group, and forwarding the data to the second beacon group.

Additionally, the request from the first beacon group may be based on a first protocol, and the data may be forwarded to the second beacon group based on a second protocol.

Additionally, the first idle message or the second idle message may include a sleep mode message.

According to another aspect, a device may include a memory to store instructions and a processor to execute the instructions. The processor may execute the instructions to announce a first idle message on a first ultra wide band sub-band, announce a second idle message on a second ultra wide band sub-band, and switch between the first and the second ultra wide band sub-bands to maintain a first connection based on the first ultra wide band sub-band and maintain a second connection based on the second ultra wide band sub-band, where the switching occurs during idle periods associated with the first idle message and the second idle message.

Additionally, the first ultra wide band sub-band may be within a first bandgroup and the second ultra wide band sub-band may be within a second bandgroup.

Additionally, the processor may further execute instructions to reserve a data slot to transmit data on at least one of the first ultra wide band sub-band or the second ultra wide band sub-band.

Additionally, the first idle message may include a standby mode message.

Additionally, the first ultra wide band sub-band and the second ultra wide band sub-band may be within the same bandgroup.

Additionally, the processor may further execute instructions to receive data from a first device associated with the first connection, and forward the data to a second device associated with the second connection.

Additionally, the first connection may be based on a first protocol and the second connection may be based on a second protocol, where the first device may not support at least one of the second protocol or the second ultra wide band sub-band.

Additionally, the first connection may be based on one of Bluetooth, certified wireless Universal Serial Bus (WUSB), Internet Protocol (IP), or wireless 1394.

According to yet another aspect, a computer-readable memory device may contain instructions executable by at least one processor, the computer-readable medium device may include one or more instructions for announcing a first idle message on a first ultra wide band sub-band, where the first idle message includes a power management message, one or more instructions for announcing a second idle message on a second ultra wide sub-band, where the second idle message includes a power management message, and one or more instructions for switching between the first and the second ultra wide band sub-bands to maintain a first connection on the first ultra wide band sub-band and maintain a second connection on the second ultra wide band sub-band.

Additionally, the computer-readable memory device may include one or more instructions for reserving a data slot to transmit on the first ultra wide band sub-band.

Additionally, the first and the second ultra wide band sub-bands may be different bandgroups.

Additionally, the computer-readable memory device may include one or more instructions for specifying an idle period that corresponds to the first idle message.

Additionally, the one or more instructions for switching may include one or more instructions for determining an idle period of switching between the first and the second ultra wide band sub-bands to maintain the first connection based on the idle period.

Additionally, the computer-readable memory device may include one or more instructions for receiving on the first connection a request to forward data, and one or more instructions for forwarding the data on the second connection.

Additionally, the first connection may be based on a first protocol and the second connection may be based on a second protocol.

According to still another aspect, a device may include means for announcing a first idle message on a first ultra wide band sub-band, means for announcing a second idle message on a second ultra wide band sub-band, and means for switching between the first and the second ultra wide band sub-bands to maintain a first connection with a first device on the first ultra wide band sub-band and maintain a second connection with a second device on the second ultra wide band sub-band, where a period of switching is based on a first idle period associated with the first idle message and a second idle period associated with the second idle message.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings:

FIG. 4 is a diagram illustrating exemplary internal components of the UWB-enabled device depicted in FIG. 2;

DETAILED DESCRIPTION

The following detailed description refers to the accompanying drawings. The same reference numbers in different drawings may identify the same or similar elements. Also, the following description does not limit the invention. The term "UWB" is intended to be broadly interpreted to include, for example, the standards defined by the WiMedia Alliance and the standards defined by the UWB Forum. Thus, while distinctions may exist between the standards, for example, on the physical layer (e.g., MB-OFDM versus Direct Sequence (DS)), the media access control (MAC) layer (e.g., time division multiple access (TDMA) in the contention free period versus slotted Aloha and TDMA in the channel time allocation period (CTAP)), the convergence layer, etc., as well as spectrum division (five BGs versus two BGs), the concepts described herein may be implemented in any of the standards.

Overview

Figure 1:
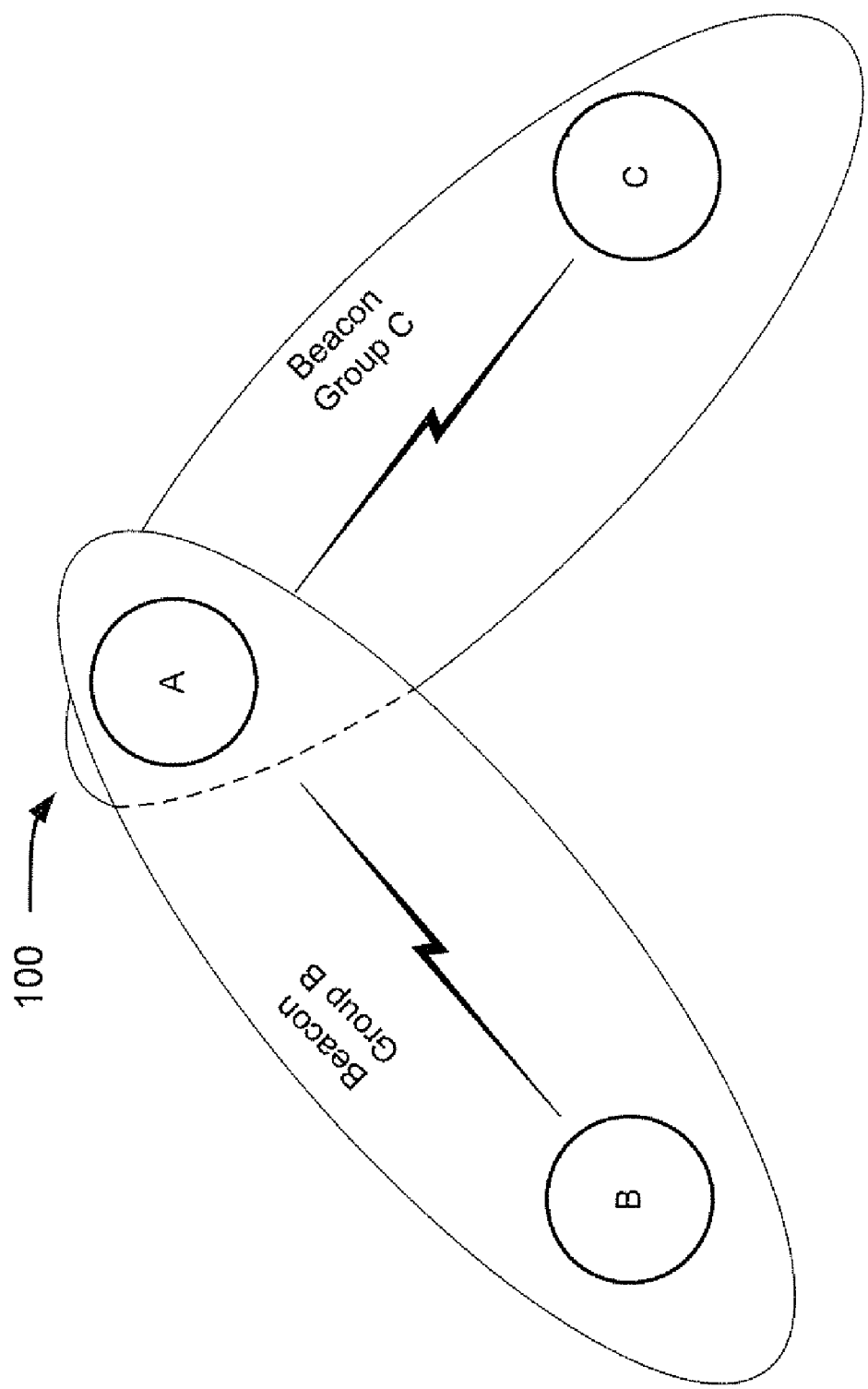
FIG. 1 is a diagram illustrating a concept described herein.

FIG. 1 is a diagram illustrating a concept as described herein. As illustrated, an environment 100 may include multiple nodes, such as nodes A, B and C. Nodes A, B, and C, may each be a UWB-enabled device. In one example, nodes A, B, and C may communicate utilizing the same BG within the UWB radio platform. Given this framework, node A may communicate with node B in beacon group B, and node A may also communicate with node C in beacon group C. As will be described herein, node A may hop between sub-bands within the BG to maintain a connection with node B and node C. Accordingly, a UWB-enabled device may maintain more than one connection with one or more other UWB-enabled devices by utilizing different sub-bands.

As will be described herein, numerous variations to FIG. 1 may be employed. For example, node B may support one BG and node C may support a different BG, but node A may support both of the BGs of node B and node C. Additionally, or alternatively, other protocols, such as Certified Wireless Universal Serial Buss (WUSB), Bluetooth, WiMedia Logical Link Control Protocol (WLP), Internet Protocol (IP), wireless 1394, etc, may use the UWB radio platform (e.g., the physical, MAC, and/or convergence layers). In this regard, for example, node A and node B of beacon group B may form a WUSB connection, while node A and node C of beacon group C may form a Bluetooth connection. Additionally, or alternatively, node A, which may support multiple BGs, may act as an intermediary to relay traffic between node B and node C. Still further, additional variations will be described below. The terms "softmultiband" or "softmultiband radio" may be used interchangeably to describe these concepts.

As a result of the foregoing, a UWB-enabled device may utilize the full potential of the UWB radio platform by enhancing connectivity with other UWB-enabled devices.

Exemplary Device

Figure 2:
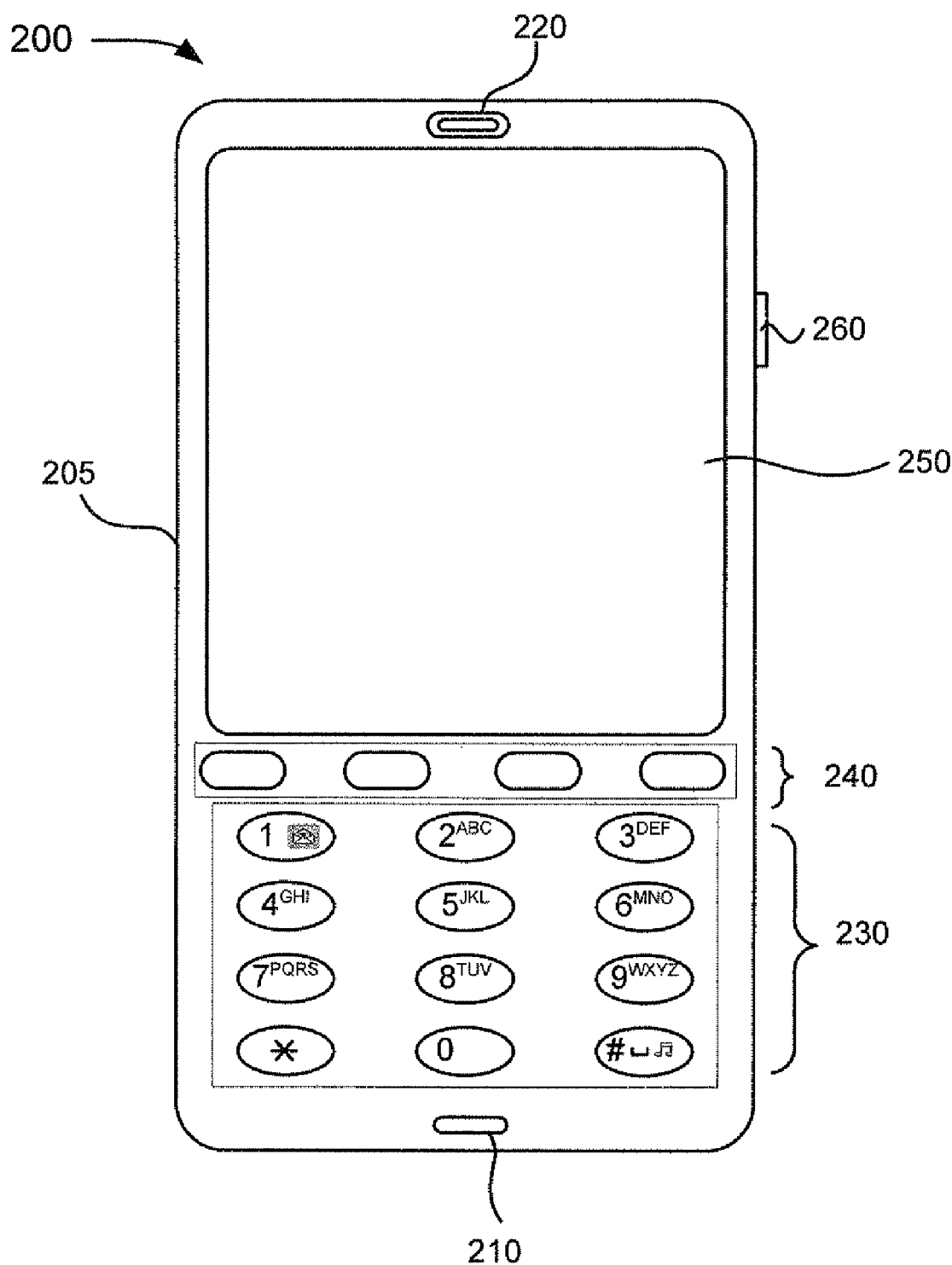
FIG. 2 is a diagram illustrating a front view of exemplary external components of an exemplary UWB-enabled device.

FIG. 2 is a diagram illustrating a front view of exemplary external components of an exemplary UWB-enabled device. As illustrated, device 200 may include a housing 205, a microphone 210, a speaker 220, a keypad 230, function keys 240, a display 250, and/or a camera button 260. The term "component," as used herein, is intended to be broadly interpreted to include hardware, software, and/or a combination of hardware and software.

Housing 205 may include a structure configured to contain components of device 200. For example, housing 205 may be formed from plastic and may be configured to support microphone 210, speaker 220, keypad 230, function keys 240, display 250, and camera button 260.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music through speaker 220.

Keypad 230 may include any component capable of providing input to device 200. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to device 200. Function keys 240 may include a key that permits a user to cause device 200 to perform one or more operations. The functionality associated with a key of function keys 240 may change depending on the mode of device 200. For example, function keys 240 may perform a variety of operations, such as placing a telephone call, playing various media, setting various camera features (e.g., focus, zoom, etc.) or accessing an application. Function keys 240 may include a key that provides a cursor function and a select function. In one implementation, each key of function keys 240 may be, for example, a pushbutton.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may be utilized to display, for example, text, image, and/or video information. Display 250 may also operate as a view finder, as will be described later. Camera button 260 may be a pushbutton that enables a user to take an image.

Device 200 is intended to be broadly interpreted to include any type of UWB-enabled device. For example, device 200 may include a portable device, such as a wireless telephone, a personal digital assistant (PDA), a camera, a headset, an audio and/or video player, an MP3 player, a digital versatile disc (DVD) player, or a computer. In other instances, device 200 may include a stationary device, such as a printer, a scanner, an audio system, speakers, a television, a game system, a computer, a display, hard disk drives, or another kind of UWB-enabled device. Still further, device 200 may include medical devices, military devices, devices in an automobile, etc. Accordingly, although FIG. 2 illustrates exemplary external components of device 200, in other implementations, device 200 may contain fewer, different, or additional external components than the external components depicted in FIG. 2. Additionally, or alternatively, one or more external components of device 200 may include the capabilities of one or more other external components of device 200. For example, display 250 may be an input component (e.g., a touch screen). Additionally, or alternatively, the external components may be arranged differently than the external components depicted in FIG. 2.

Figure 3:
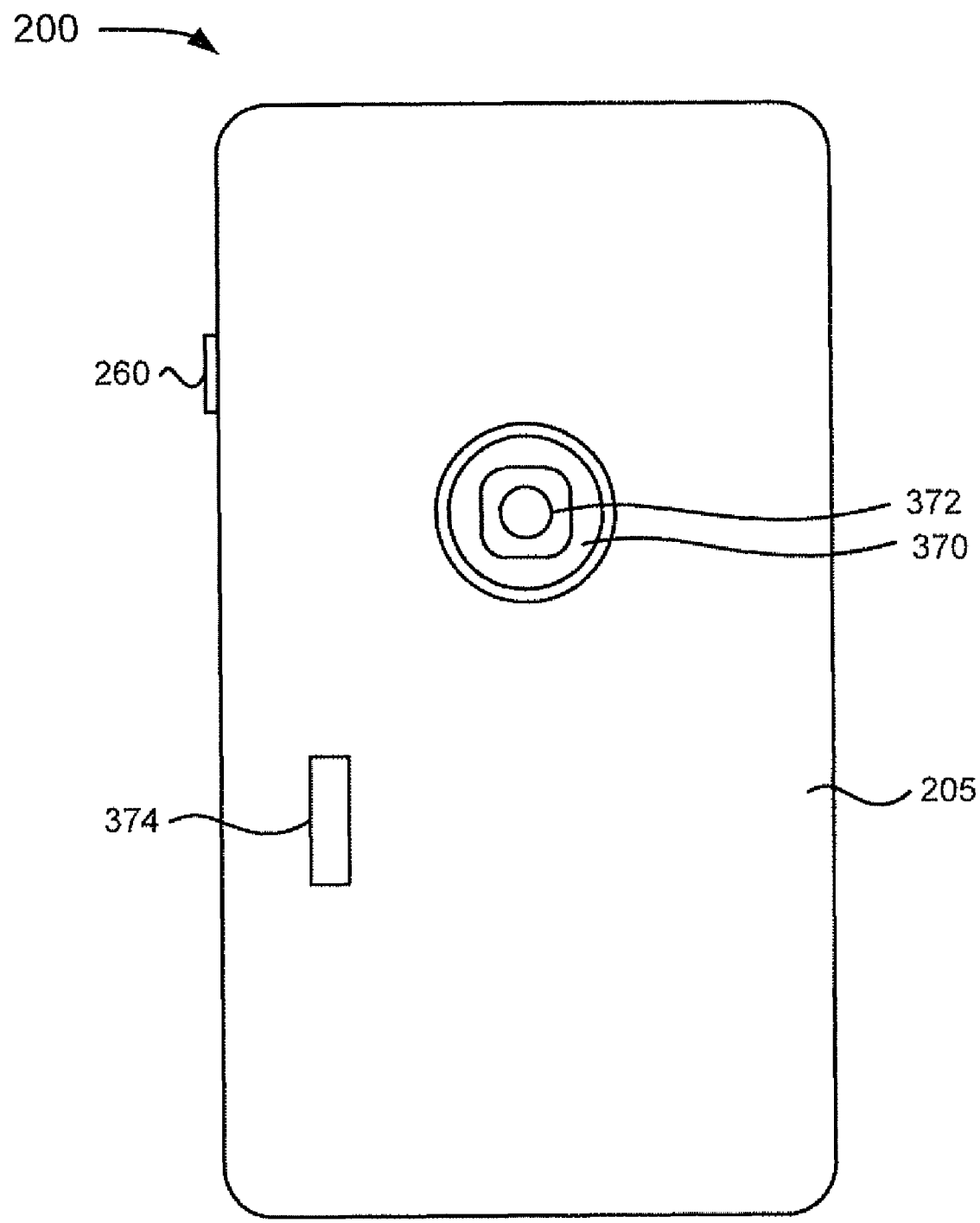
FIG. 3 is a diagram illustrating a rear view of exemplary external components of the UWB-enabled device depicted in FIG. 2.

FIG. 3 is a diagram illustrating a rear view of exemplary external components of the UWB-enabled device depicted in FIG. 2. As illustrated, in addition to the components previously described, device 200 may include a camera 370, a lens assembly 372, and/or a flash 374.

Camera 370 may include any component capable of capturing an image and/or video. Camera 370 may be a digital camera. Display 250 may operate as a view finder when a user of device 200 operates camera 370. Camera 370 may provide for automatic and/or manual adjustment of a camera setting. In one implementation, device 200 may include camera software that is displayable on display 250 to allow a user to adjust a camera setting. For example, a user may be able adjust a camera setting by operating function keys 240.

Lens assembly 372 may include any component capable of manipulating light so that an image may be captured. Lens assembly 372 may include a number of optical lens elements. The optical lens elements may be of different shapes (e.g., convex, biconvex, plano-convex, concave, etc.) and different distances of separation. An optical lens element may be made from, for example, glass, plastic (e.g., acrylic), or plexiglass. In one implementation, lens assembly 372 may be permanently fixed to camera 370. Lens assembly 372 may provide for a variable aperture size (e.g., adjustable f-number).

Flash 374 may include any type of light-emitting component to provide illumination when camera 370 captures an image. For example, flash 374 may be a light-emitting diode (LED) flash (e.g., a white LED) or a xenon flash.

Although FIG. 3 illustrates exemplary external components, in other implementations, device 200 may include fewer, additional, and/or different components than the exemplary external components depicted in FIG. 3. For example, device 200 may not include camera 370 and other components associated therewith. In still other implementations, one or more external components of device 200 may be arranged differently.

FIG. 4 is a diagram illustrating exemplary internal components of the UWB-enabled device depicted in FIG. 2. As illustrated, device 200 may include microphone 210, speaker 220, keypad 230, function keys 240, display 250, camera button 260, camera 370, a memory 400 (with a UWB driver 410), a transceiver 420, and a control unit 430. Microphone 210, speaker 220, keypad 230, function keys 240, display 250, camera button 260, and camera 370 may include the features and/or capabilities described above in connection with FIGS. 2 and 3.

Memory 400 may include any type of storage component that stores data and instructions related to the operation and use of device 200. For example, memory 400 may include a memory component, such as a random access memory (RAM), a dynamic random access memory (DRAM), a static random access memory (SRAM), a synchronous dynamic random access memory (SRAM), a ferroelectric random access memory (FRAM), a read only memory (ROM), a programmable read only memory (PROM), an erasable programmable read only memory (EPROM), an electrically erasable read only memory (EEPROM), and/or a flash memory. Additionally, memory 400 may include a storage component, such as a magnetic storage component (e.g., a hard drive), a compact disc (CD) drive, a DVD drive, or another type of computer-readable medium. Memory 400 may also include an external storing component, such as a Universal Serial Bus (USB) memory stick, a digital camera memory card, and/or a Subscriber Identity Module (SIM) card.

Memory 400 may include UWB driver 410. UWB driver 410 may include any component for enabling device 200 to communicate with other UWB-enabled devices, as described herein. UWB driver 410 may drive various components of device 200 including, for example, a UWB protocol stack and other protocol stacks (Bluetooth, etc.) that may be stored in memory 400. In one implementation, UWB driver 410 may include a software application. In other implementations, UWB driver 410 may include any component (i.e., hardware and/or software) that provides the capabilities as described herein. For example, UWB driver 410 may include various chipsets and/or field programmable gate arrays (FPGAs).

Transceiver 420 may include any component capable of transmitting and receiving information. For example, transceiver 420 may include a radio circuit that provides wireless communication with a network or another device. Transceiver 420 may support UWB radio communication.

Control unit 430 may include any logic that may interpret and execute instructions, and may control the overall operation of device 200. Logic, as used herein, may include hardware, software, and/or a combination of hardware and software. Control unit 430 may include, for example, a general-purpose processor, a microprocessor, a data processor, a co-processor, a network processor, an application specific integrated circuit (ASIC), a field programmable gate array (FPGA), etc. Control unit 430 may access instructions from memory 400, from other components of device 200, and/or from a source external to device 200 (e.g., a network or another device). Control unit 430 may provide for different operational modes associated with device 200. Additionally, control unit 430 may operate in multiple modes simultaneously. For example, control unit 430 may operate in a camera mode, a walkman mode, and/or a telephone mode.

Device 200 depicted in FIG. 4 may perform certain operations relating to UWB driver 410. Device 200 may perform these operations in response to control unit 430 executing software instructions contained in a computer-readable medium, such as memory 400. A computer-readable medium may be defined as a physical or logical memory device and/or a signal, such as communication signal (e.g., a carrier wave). The software instructions may be read into memory 400 and may cause control unit 430 to perform processes associated with UWB driver 410. Alternatively, hardwired circuitry may be used in place of or in combination with software instructions to implement processes described herein. Thus, implementations described herein are not limited to any specific combination of hardware circuitry and software.

Although FIG. 4 illustrates exemplary internal components, in other implementations, device 200 may include fewer, additional, and/or different components than the exemplary internal components depicted in FIG. 4. For example, in other implementations, one or more internal components of device 200 may include the capabilities of one or more other components of device 200. For example, transceiver 420 and/or control unit 210 may include their own on-board memory 400.

Figure 5A:
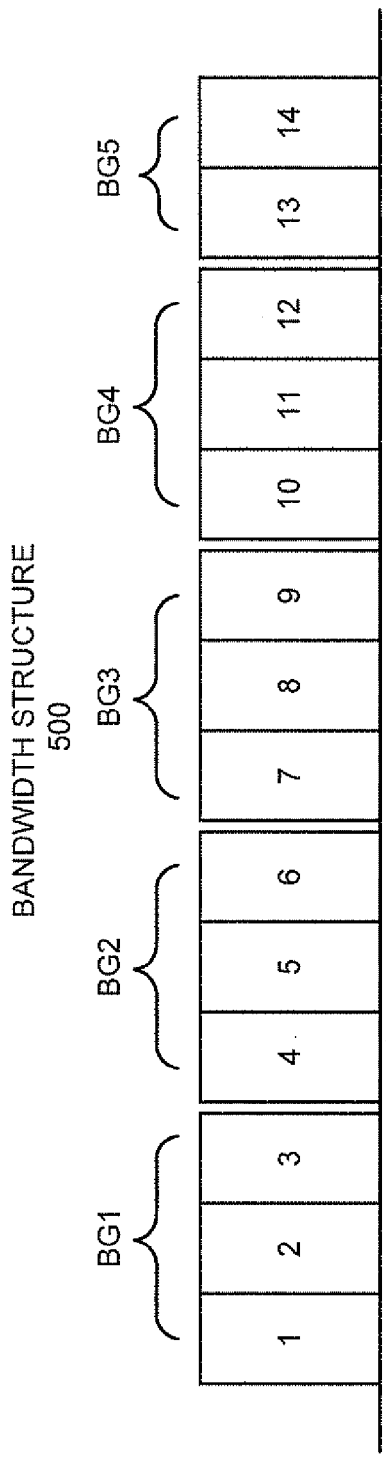
FIG. 5A is a diagram illustrating an exemplary bandwidth structure for an ultra wide band communication environment.

FIG. 5A is a diagram illustrating an exemplary bandwidth structure for an ultra wide band communication environment. For purposes of discussion, the bandwidth structure according to the WiMedia Alliance is illustrated in FIG. 5A. As illustrated, bandwidth structure 500 for the ultra wide band communication environment may include five BGs that operate over an unlicensed 3.1 to 10.6 gigahertz (GHz) band. However, depending on the region (e.g., country), variations to the bandwidth structure may be employed. The five BGs may include a total of fourteen sub-bands and each sub-band may include a bandwidth of 528 MHz.

Figure 5B:
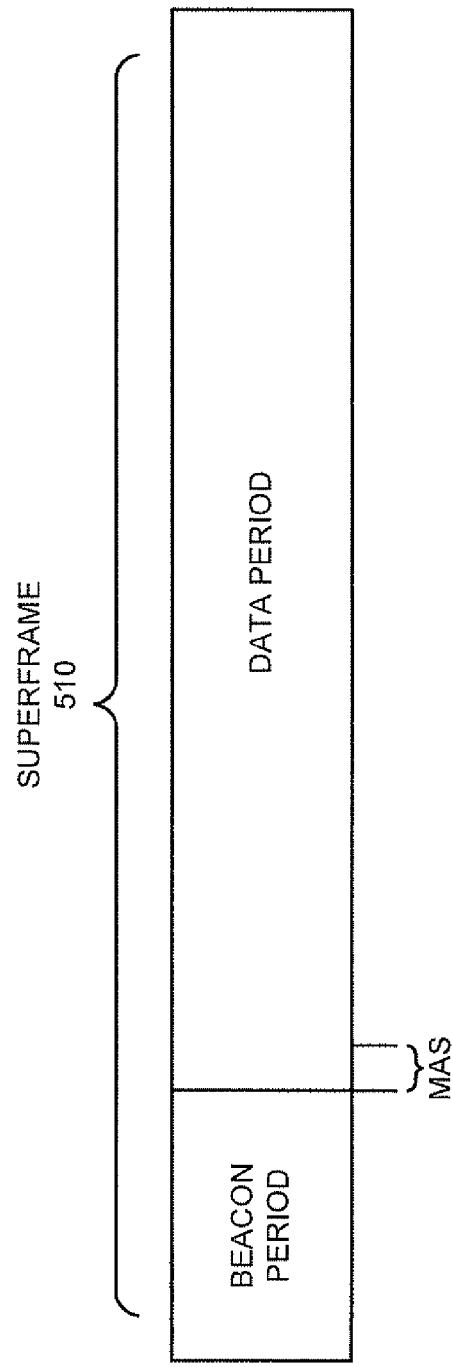
FIG. 5B is a diagram illustrating an exemplary superframe of an ultra wide band communication environment.

FIG. 5B is a diagram illustrating an exemplary superframe of an ultra wide band communication environment. For purposes of discussion, the superframe structure according to the WiMedia Alliance is illustrated in FIG. 5B. As illustrated, a superframe 510 may include a beacon period and a data period. Superframe 510 may include "256" media allocation slots (MASs). The MAS may be a basic bandwidth allocation unit. The beacon period may include "32" MASs and the data period may include "224" MASs. Superframe 510 may occupy a period of 65 milliseconds.

In one implementation, if a device, such as device 200, establishes communication with another device, device 200 may signal within the beacon period. The beacon period may allow device 200 to, for example, announce its presence and reserve MASs in accordance with, for example, the distributed reservation protocol (DRP). Device 200 may transmit data during the data period corresponding to the reserved MASs. The reservation of MASs may be maintained until device 200 releases the reservation of MASs. For example, device 200 may reserve 112 MASs (1-112) during a first beacon period of a first superframe 510. The reservation of 112 MASs may continue during a second superframe 510, a third superframe 510, etc., until device 200 releases the reservation of MASs. Device 200 may also provide for other types of signaling within the beacon period, as described further in reference to FIG. 6B.

Although FIGS. 5A and 5B illustrate exemplary bandwidth structure 500 and superframe 510, in other implementations, bandwidth structure 500 and/or superframe 510 may be different than the bandwidth structure and superframe depicted in FIG. 5A and FIG. 5B.

Figure 6A:
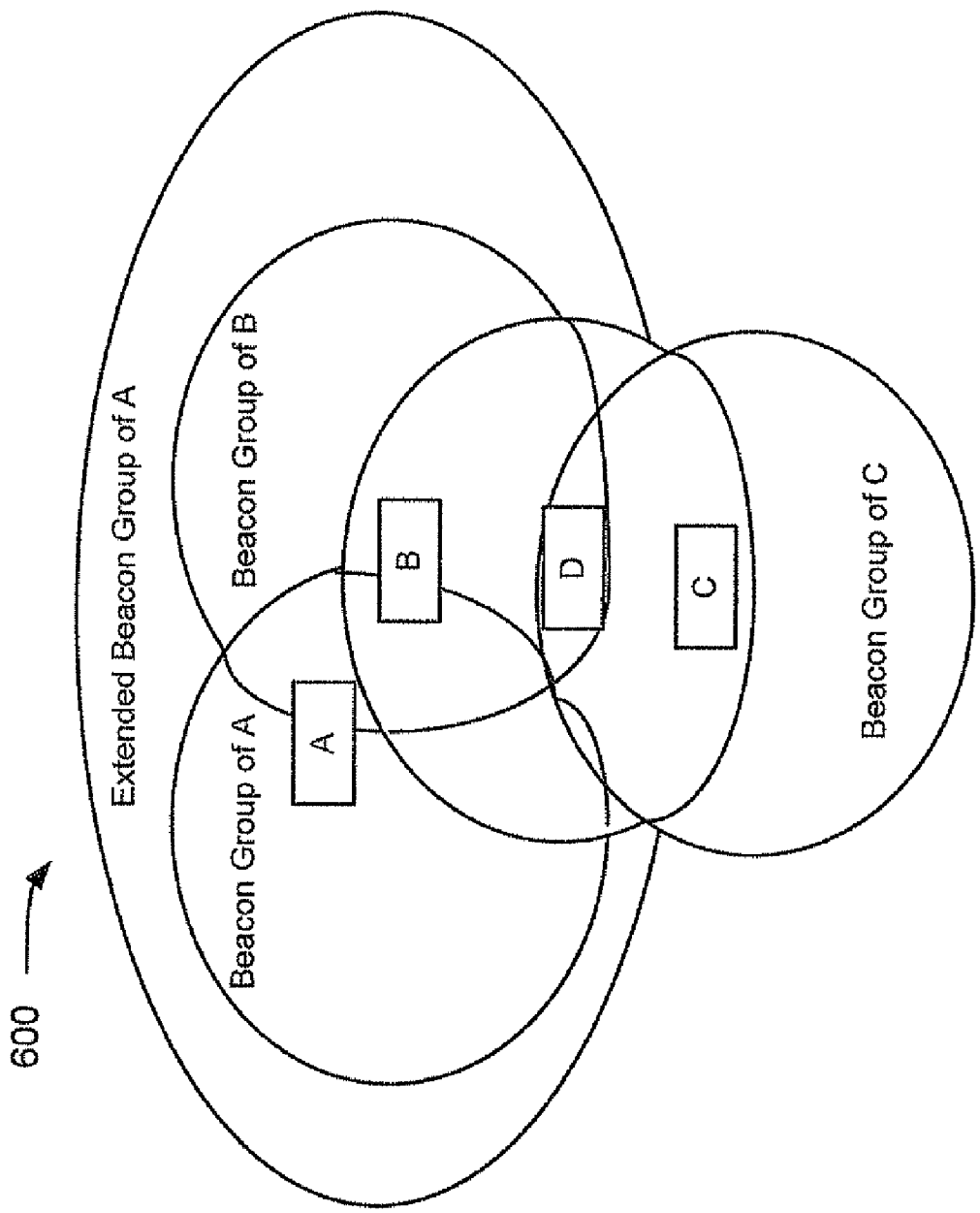
FIG. 6A is a diagram illustrating an exemplary ultra wide band communication environment for employing the concepts described herein.

FIG. 6A is a diagram illustrating an exemplary ultra wide band communication environment 600 for employing the concepts described herein. As illustrated, environment 600 may include nodes A, B, C, and D, and each of the nodes may be a UWB-enabled device. Extended beacon group A may include nodes A, B, and D, and beacon group C may include nodes C and D. Thus, node D may be connected to nodes A, B, and C.

If extended beacon group A decides to change sub-band, nodes B and D may have to follow to keep their connection. However, if node C is incapable of changing sub-band, then node D, for example, may lose connection with node C. That is, a typical UWB-enabled device may not be able to maintain a connection with nodes A, B, and C. However, if node D includes a UWB-enabled device, such as device 200, and utilizes softmultiband radio, node D may be able to maintain a connection with nodes A, B, and C.

Figure 6B:
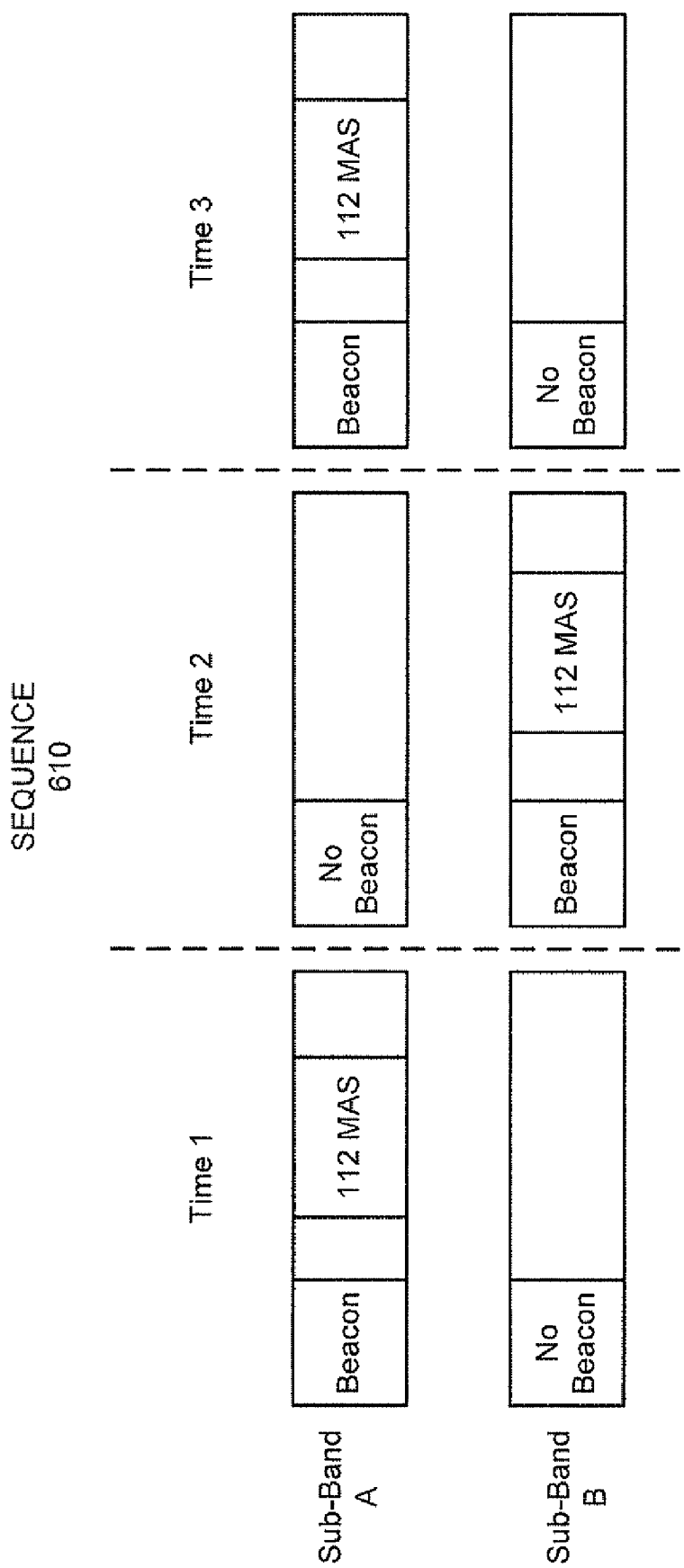
FIG. 6B is a diagram illustrating an exemplary sequence of superframes for employing the concepts described herein.

FIG. 6B is a diagram illustrating an exemplary sequence of superframes for employing the concepts described herein. As illustrated, sequence 610 of superframes (e.g., superframes 510) may occur on two different sub-bands, such as sub-band A and sub-band B.

Referring to FIGS. 6A and 6B, node D may reserve MASs (e.g., "112" MASs) during a beacon period of time 1 of sub-band A. Alternatively, node D may have previously reserved the MASs (e.g., "112" MASs) during a previous time period. If beacon group A decides to change sub-band, node D may announce, for example, a sleep mode, during the beacon period of time 1 of sub-band A, even though node D may not intend to sleep. The UWB radio platform may support sleep mode announcements. Further, the UWB radio platform may provide that a device that enters a sleep mode may sustain its reservation of MASs for a certain period of time. In this way, node D may preserve the reservation of "112" MASs associated with sub-band A (e.g., at least for several seconds), and may provide a time window to change to a different sub-band. In one implementation, the announcement of sleep mode may include how many beacon periods, superframes, and/or time periods that node D intends to remain in sleep mode (i.e., silent).

Node D and nodes A and B (extended beacon group A) may change from sub-band A to sub-band B. Similarly, node D may reserve MASs (e.g., "112" MASs) during a beacon period of time 2 of sub-band B. Additionally, node D may announce a sleep mode, during a beacon period of time 2 of sub-band B, even though node D may not intend to sleep. If this is performed, node D may switch back to sub-band A of beacon group C at time 3 and may transmit data and/or receive data. Node D may repeat the announcements of sleep mode on sub-bands A and B to permit node D to alternate between extended beacon group A and beacon group C and to maintain multiple connections.

Under the UWB radio platform, a device may reserve and be guaranteed up to "112" MASs. Thus, although, node D may have limited bandwidth for each beacon group, node D may maintain multiple connections. Further, depending on the UWB environment and the UWB-enabled devices therein, including device 200, the sub-bands may or may not be within the same BG. For example, a multiband hopping scheme may allow multiple UWB devices to share the UWB spectrum within a BG by varying their hopping sequences and/or by operating in a separate sub-band. Additionally, or alternatively, the sub-bands may be within different BGs. Accordingly, device 200 may determine appropriate sub-bands in which to maintain multiple connections. In one implementation, device 200 may determine appropriate sub-bands based on information elements (IEs) contained in the beacon periods. That is, under the UWB radio platform, other UWB-enabled devices may announce during the beacon period medium occupancy and/or device capabilities.

Although FIG. 6A and FIG. 6B illustrate an exemplary superframe exchange within an exemplary UWB environment, in other implementations, a different environment and/or superframe exchange than those described in relation to FIG. 6A and FIG. 6B may be employed. For example, in a different environment, device 200 may maintain more than two connections. Additionally, or alternatively, each connection may encompass more than one sub-band and/or BG. Further, the connections need not be the same type of connection. For example, one connection may be based on Bluetooth and the other connection may be based on WUSB, or some other protocol that supports the UWB radio platform.

As described above, device 200 may announce, for example, a sleep mode, during the beacon period before changing sub-bands. However, other modes may be announced, such as standby mode. Accordingly, such announcements may be referred to as idle messages. In one implementation, device 200 may determine a period of switching between multiple connections based on an idle period associated with an idle message. The idle period for each connection may or may not be different. Additionally, for example, device 200 may transmit in every superframe even though device 200 may not transmit a beacon, so long as the reserved MASs in the different sub-bands and/or BGs do not overlap in time.

Figure 7:
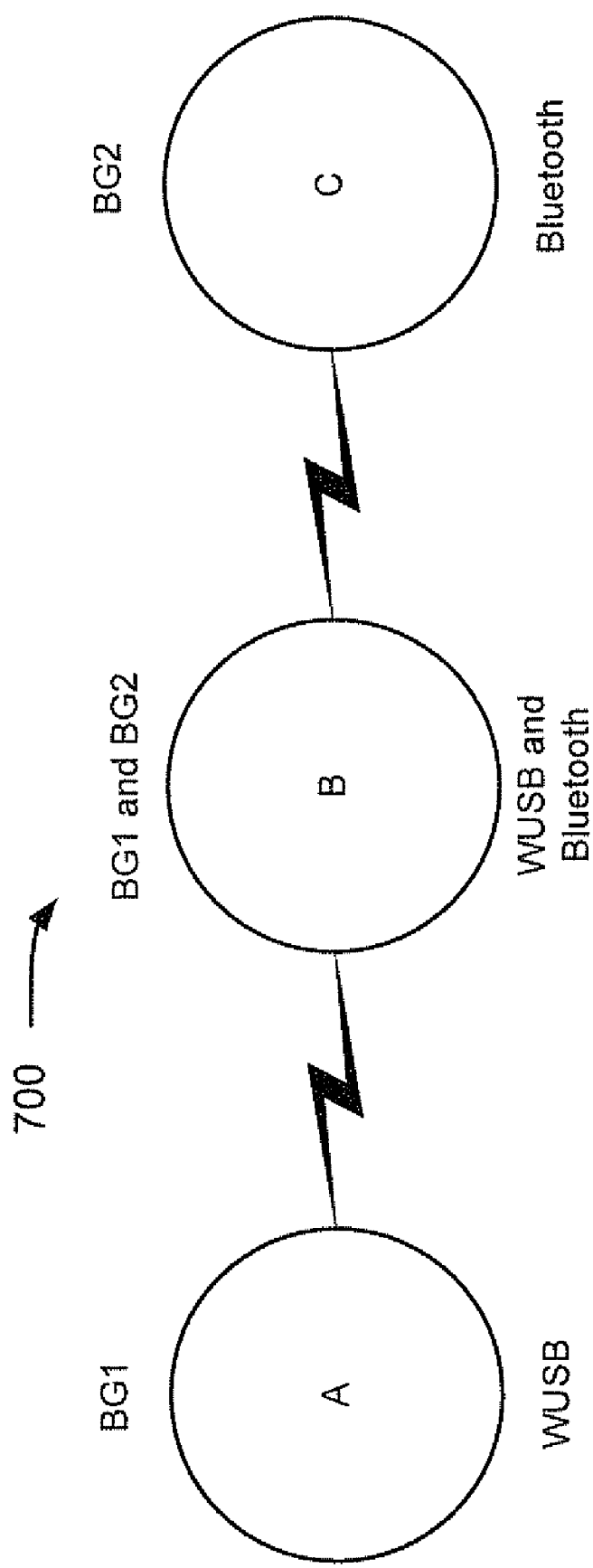
FIG. 7 is a diagram illustrating an exemplary ultra wide band communication environment for employing the concepts described herein.

FIG. 7 is a diagram illustrating an exemplary ultra wide band communication environment for employing the concepts described herein. As illustrated, environment 700 may include nodes A, B, and C, each of which may be a UWB-enabled device. Node A may support BG 1, Node C may support BG2, and node B may support both BG1 and BG2. Accordingly, node A may not be able to connect to node C. In this instance, however, node A and node C may connect to each other via node B. For example, node B, such as device 200, may relay the traffic between node A and node C using softmultiband radio. That is, node B may switch between BGs so that a connection between node A and node C may exist. In this regard, node B may provide sub-band translation between two UWB-enabled devices that do not support the same BG.

Although FIG. 7 illustrates an exemplary environment, in other implementations, the environment may include fewer, additional or different nodes than those depicted in FIG. 7.

Figure 8:
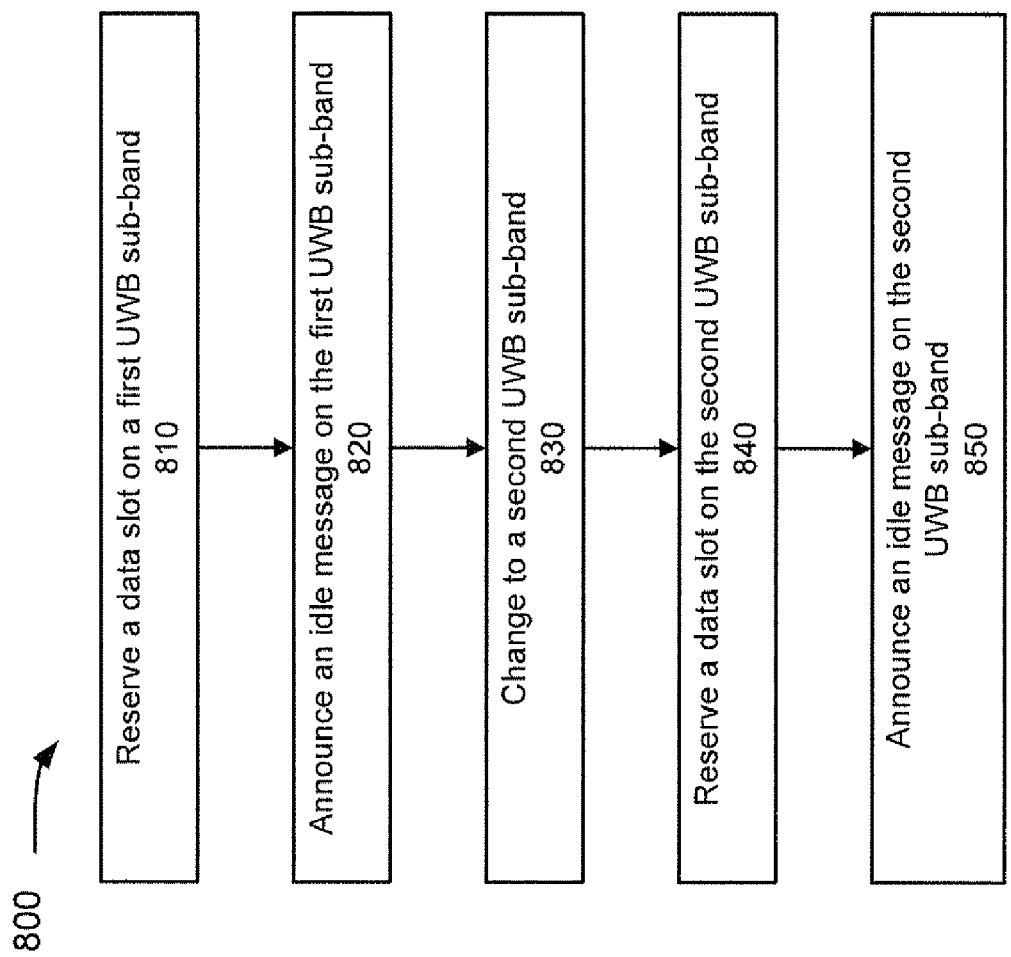
FIG. 8 is a flow diagram illustrating an exemplary process for providing multiple connections based on ultra wide band.

FIG. 8 is a flow diagram illustrating an exemplary process for providing multiple connections based on ultra wide band. Process 800 may begin with reserving a data slot on a first UWB sub-band (Block 810). For example, device 200 may reserve MASs or channel time allocation periods (CTAs) during a beacon period of superframe 510 associated with a first beacon group.

In Block 820, a first idle message on the first UWB sub-band may be announced. For example, device 200 may announce a sleep mode or a standby mode to the first beacon group during a beacon period of superframe 510. In one implementation, device 200 may announce a number of silent beacons, superframes 510 and/or time period that device 200 intends to remain idle.

In Block 830, the device may change to a second UWB sub-band. For example, device 200 may change to a second UWB sub-band associated with a second beacon group in accordance with the idle message.

In Block 840, the device may reserve data slots on the second UWB sub-band. For example, device 200 may reserve MASs or CTAPs during a beacon period of superframe 510 associated with the second beacon group.

In Block 850, a second idle message on the second UWB sub-band may be announced. For example, device 200 may announce a sleep mode or standby mode to the second beacon group during a beacon period of superframe 510. In one implementation, device 200 may announce the number of silent beacons, superframes 510 and/or time period that device 200 intends to remain idle. In other implementations, device 200 may transmit data after a reservation is made.

Although FIG. 8 illustrates an exemplary process, in other implementations, fewer, additional or different processes than those depicted in FIG. 8 may be performed. For example, as described below in connection with FIGS. 9 and 10, device 200 may receive data on the first UWB sub-band and transmit data on the second UWB sub-band. Accordingly, device 200 may receive data and/or transmit data on the first UWB sub-band and/or the second UWB sub-band. Based on this framework, device 200 may omit, for example, block 810 and/or block 840, depending on whether device 200 intends to transmit data and/or receive data with respect to a connection.

EXAMPLES

Figure 9:
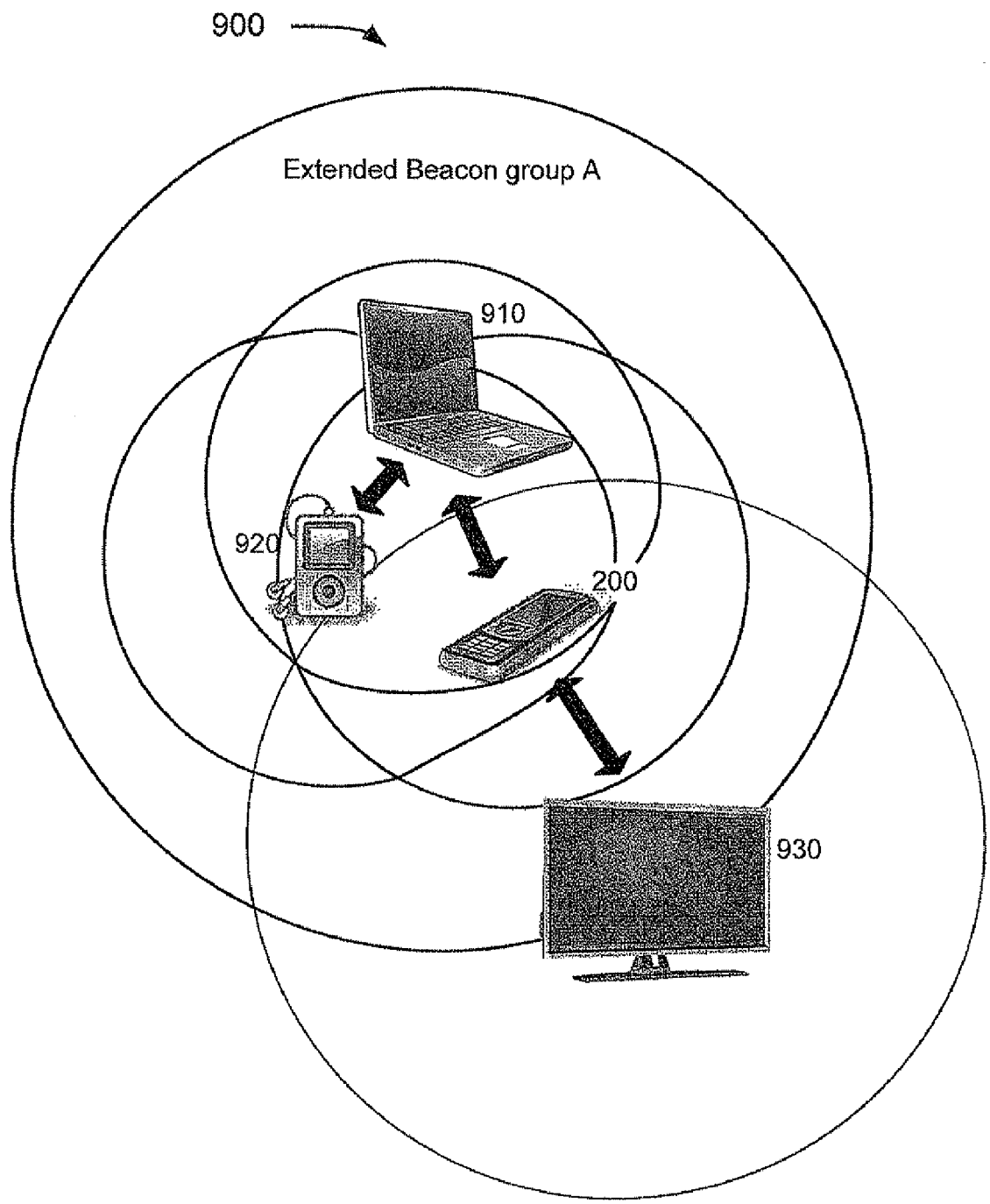
FIG. 9 is a diagram illustrating exemplary operations according to the concepts described herein.
Figure 10:
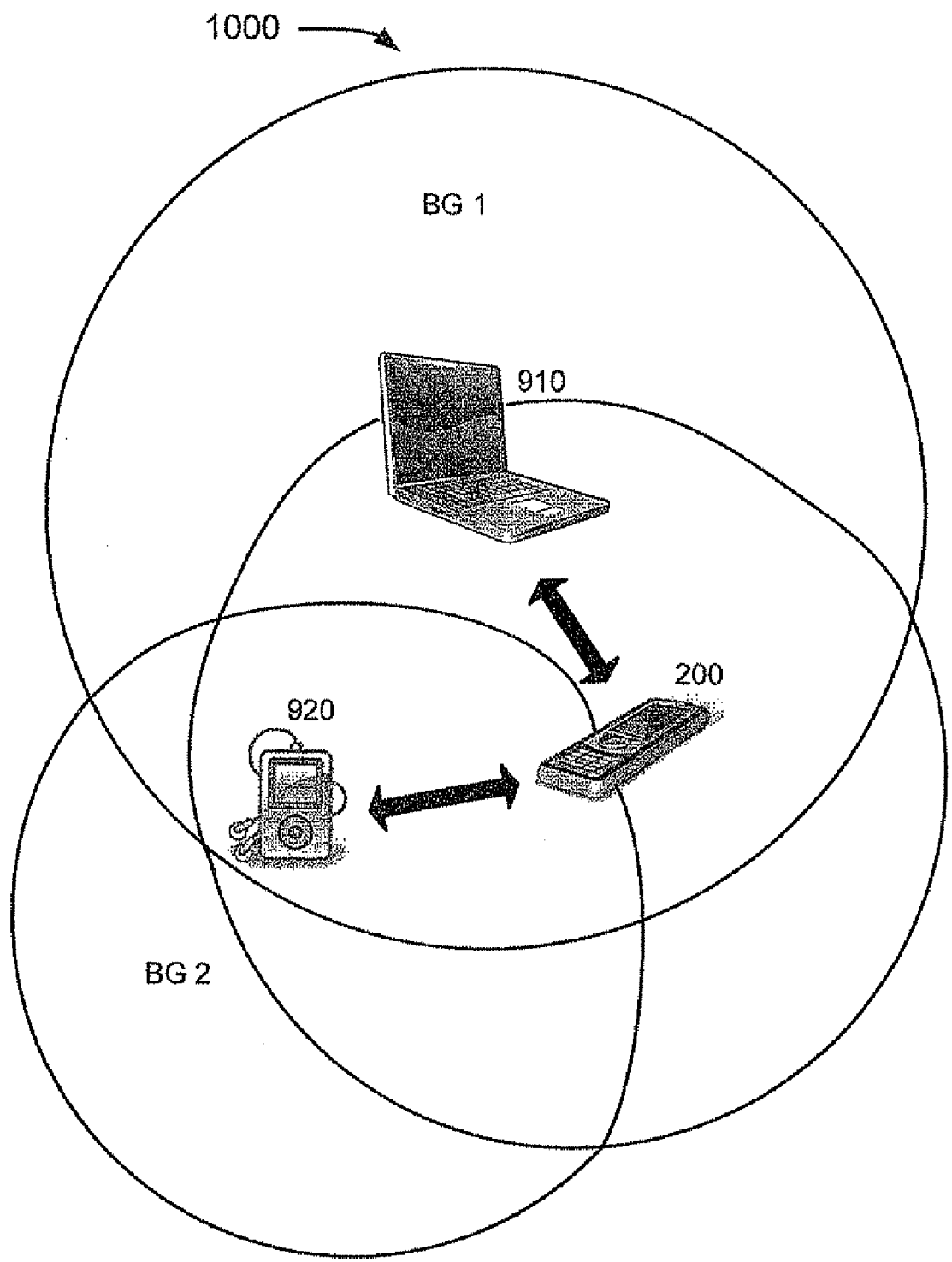
FIG. 10 is a diagram illustrating exemplary operations according to the concepts described herein.

FIGS. 9 and 10 are diagrams illustrating exemplary operations according to the concepts described herein. FIG. 9 illustrates an ultra wide band environment 900. As illustrated, environment 900 may include a laptop 910, a MP3 player 920, device 200 (e.g., a mobile phone), and/or a high definition television (HDTV) 930. All of these devices may use the same sub-band. In this scenario, MP3 player 920 may be connected to the laptop 910 and may be transferring music files. Device 200 may be synchronizing data with laptop 910 and at the same time may be streaming video to HDTV 930.

Thereafter, beacon group A may decide to change sub-bands. In such an instance, MP3 player 920 and device 200 may have to change sub-bands to maintain their connections with laptop 910. However, HDTV 930 may not be able to change sub-bands. Accordingly, in these circumstances, a typical UWB-enabled device may lose connection with HDTV 930. That is, if device 200 were a typical UWB-enabled device, device 200 would have to drop the streaming video connection with HDTV, or interrupt the synchronization with laptop 910 in order to maintain the streaming video to HDTV 930. Fortunately, device 200 may employ softmultiband radio to maintain the connections with laptop 910 and HDTV 930 and continue to synchronize data and stream the video.

FIG. 10 illustrates an ultra wide band environment 1000. As illustrated, environment 1000 may include laptop 910, MP3 player 920, and device 200 (e.g., a PDA). Laptop 910 may operate within BG1, MP3 player 920 may operate within BG 2, and device 200 may operate within BG1 and BG2. In this scenario, MP3 player 920 may wish to connect to laptop 910 with WUSB. However, MP3 player 920 may not support WUSB and may not support BG1. In this instance, MP3 player 920 may connect to device 200 using UWB and connect to laptop 910 via device 200. In one implementation, device 200 may use softmultiband radio to perform frequency translation (i.e., BG2 to BG1) and protocol adaptation (i.e., UWB with WUSB).

Although FIGS. 9 and 10 illustrate exemplary operations, in other implementations, fewer, additional or different operations than those depicted in FIGS. 9 and 10 may be performed. For example, with respect to FIG. 10, device 200 may perform different protocol adaptations (e.g., Bluetooth over UWB, etc.).

CONCLUSION

The foregoing description of implementations provides illustration, but is not intended to be exhaustive or to limit the implementations to the precise form disclosed. Modifications and variations are possible in light of the above teachings or may be acquired from practice of the teachings. For example, the concepts described herein may be applied to, for example, any data delivery container employed over two or more frequencies having an announcement period such that a device may not necessarily have to transmit every announcement period.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of blocks has been described with regard to processes illustrated in FIG. 8, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method performed on an ultra wide band device, the method comprising:
   announcing a first idle message on a first ultra wide band sub-band associated with a first beacon group;
   announcing a second idle message on a second ultra wide band sub-band associated with a second beacon group; and
   switching between the first and the second ultra wide band sub-bands to maintain a first connection with the first beacon group and a second connection with the second beacon group.

2. The method of claim 1, further comprising:
   reserving a data slot on the first ultra wide band sub-band.

3. The method of claim 2, further comprising:
   transmitting data based on the reserved data slot.

4. The method of claim 1, where the announcing the first idle message comprises:
   specifying an idle period that corresponds to the first idle message.

5. The method of claim 1, where the first and the second ultra wide band sub-bands are in different bandgroups.

6. The method of claim 1, where the first connection and the second connection are based on different protocols.

7. The method of claim 1, further comprising:
   receiving a request to forward data from the first beacon group; and
   forwarding the data to the second beacon group.

8. The method of claim 7, where the receiving comprises:
   receiving the request from the first beacon group based on a first protocol; and
   forwarding the data to the second beacon group based on a second protocol.

9. The method of claim 1, where the first idle message or the second idle message includes a sleep mode message.

10. A device comprising:
    a memory to store instructions; and
    a processor to execute the instructions to:
       announce a first idle message on a first ultra wide band sub-band;
       announce a second idle message on a second ultra wide band sub-band; and
       switch between the first and the second ultra wide band sub-bands to maintain a first connection based on the first ultra wide band sub-band and maintain a second connection based on the second ultra wide band sub-band, where the switching occurs during idle periods associated with first idle message and the second idle message.

11. The device of claim 10, where the first ultra wide band sub-band is within a first bandgroup and the second ultra wide band sub-band is within a second bandgroup.

12. The device of claim 10, where the processor further executes instructions to:
    reserve a data slot to transmit data on at least one of the first ultra wide band sub-band or the second ultra wide band sub-band.

13. The device of claim 10, where the first idle message includes a standby mode message.

14. The device of claim 10, where the first ultra wide band sub-band and the second ultra wide sub-band are within the same bandgroup.

15. The device of claim 10, where the processor further executes instructions to:
    receive data from a first device associated with the first connection; and
    forward the data to a second device associated with the second connection.

16. The device of claim 15, where the first connection is based on a first protocol and the second connection is based on a second protocol, where the first device fails to support at least one of the second protocol or the second ultra wide band sub-band.

17. The device of claim 16, where the first connection is based on one of Bluetooth, certified wireless Universal Serial Bus (WUSB), Internet Protocol (IP), or wireless 1394.

18. A non-transitory computer-readable memory device containing instructions executable by at least one processor, the computer-readable medium device comprising:
    one or more instructions for announcing a first idle message on a first ultra wide band sub-band, where the first idle message includes a power management message;
    one or more instructions for announcing a second idle message on a second ultra wide band sub-band, where the second idle message includes a power management message; and
    one or more instructions for switching between the first and the second ultra wide band sub-bands to maintain a first connection on the first ultra wide band sub-band and maintain a second connection on the second ultra wide band sub-band.

19. The non-transitory computer-readable memory device of claim 18, the computer-readable medium device further comprising:
    one or more instructions for reserving a data slot to transmit data on the first ultra wide band sub-band.

20. The non-transitory computer-readable memory device of claim 18, where the first and the second ultra wide band sub-bands are in different bandgroups.

21. The non-transitory computer-readable memory device of claim 18, where the one or more instructions for announcing the first idle message comprises:
   one or more instructions for specifying an idle period that corresponds to the first idle message.

22. The non-transitory computer-readable memory device of claim 21, where the one or more instructions for switching comprises:
   one or more instructions for determining a period of switching between the first and the second ultra wide band sub-bands to maintain the first connection based on the idle period.

23. The non-transitory computer-readable memory device of claim 18, where the computer-readable medium device further comprises:
   one or more instructions for receiving on the first connection a request to forward data; and
   one or more instructions for forwarding the data on the second connection.

24. The non-transitory computer-readable memory device of claim 18, where the first connection is based on a first protocol and the second connection is based on a second protocol.

25. A device comprising:
   means for announcing a first idle message on a first ultra wide band sub-band;
   means for announcing a second idle message on a second ultra wide band sub-band; and
   means for switching between the first and the second ultra wide band sub-bands to maintain a first connection with a first device on the first ultra wide band sub-band and maintain a second connection with a second device on the second ultra wide band sub-band, where a period of switching is based on a first idle period associated with the first idle message and a second idle period associated with the second idle message.

* * * * *